(12) United States Patent
Wong et al.

(10) Patent No.: US 7,438,509 B1
(45) Date of Patent: Oct. 21, 2008

(54) SLUG RETRIEVAL APPARATUS

(76) Inventors: Wing Chai Wong, 7709 19th St., Brooklyn, NY (US) 11214; Pik Ngar Wong, 7709 19th St., Brooklyn, NY (US) 11214

( * ) Notice: Subject to any disclaimer, the term of this patent is extended or adjusted under 35 U.S.C. 154(b) by 0 days.

(21) Appl. No.: 11/769,682

(22) Filed: Jun. 27, 2007

(51) Int. Cl.
*B23B 51/04* (2006.01)

(52) U.S. Cl. .......................... 408/67; 408/204

(58) Field of Classification Search ............ 408/79, 408/80, 67, 68, 204–209, 201, 703; 137/318; *B23B 51/04, B23B 51/05*
See application file for complete search history.

(56) References Cited

U.S. PATENT DOCUMENTS

| | | | | |
|---|---|---|---|---|
| 438,740 | A | * | 10/1890 | Eley ..................... 137/15.09 |
| 485,715 | A | * | 11/1892 | Smith ..................... 408/67 |
| 1,045,289 | A | * | 11/1912 | Hill ..................... 408/86 |
| 2,941,427 | A | * | 6/1960 | Burton ..................... 408/83 |
| 2,972,915 | A | * | 2/1961 | Milanovits et al. .......... 137/318 |
| 3,572,182 | A | | 3/1971 | McDonald |
| 4,279,551 | A | | 7/1981 | Wilterding |
| 4,676,701 | A | | 6/1987 | Palm |
| D438,219 | S | | 2/2001 | Brutscher |
| 7,159,603 | B2 | * | 1/2007 | King et al. ............... 137/15.14 |
| 7,357,605 | B2 | * | 4/2008 | Weiler ..................... 408/67 |

FOREIGN PATENT DOCUMENTS

JP          11320226 A   *  11/1999

* cited by examiner

*Primary Examiner*—Daniel W Howell

(57) ABSTRACT

The slug retrieval apparatus is used with a hole saw with chuck mechanism, after a pilot hole is drilled. The apparatus is fitted within the chuck mechanism and the hole saw then used to cut a hole in the workpiece. The shaft of the apparatus guides the hole saw cut, as would the shaft of a pilot bit. The springs within the slot of the shaft compress within the slot to allow the shaft to pass through the pilot hole drilled in the workpiece. The springs then expand to capture the shaft within the hole. When the slug is cut from the workpiece by the saw, the springs capture the slug until the user compresses the springs to remove the slug. The springs provide for expansion no matter the speed of the apparatus used to drive the hole saw.

4 Claims, 3 Drawing Sheets

SLUG RETRIEVAL APPARATUS

BACKGROUND OF THE INVENTION

Cutting a large circular hole is faster than drilling the same hole, therefore hole saws enjoy wide acceptance and use. As less material is removed, the cut builds less heat, saves tools and time, and takes less effort. A pilot hole is drilled. The pilot hole then guides the hole saw in cutting the larger hole in the workpiece. A slug is the term for the remaining cutout material. The cutout material typically falls into the or below the workpiece. If the area below the workpiece is inaccessible, slug retrieval may be difficult. If the workpiece is tubular, slug retrieval is even more difficult or totally impossible. Leaving the slug behind or within material is often an undesirable option. Of the existing tools designed to assist in slug removal, proper operation is not always possible. Centrifugal devices cannot be relied upon, as debris from the cut hole is likely to foul such devices. Centrifugal devices are further constrained from optimal performance as oftentimes a slow cutting speed is needed in cutting the holes, which negates centrifugal action. A device is needed for slug retention to the hole saw mechanism, and thence removal from the hole. What is needed is a basic device which is works in all conditions, be it slow or rapid revolution of the saw, one which removably replaces a pilot bit in a hole saw and retrieves the slug.

FIELD OF THE INVENTION

The slug retrieval apparatus relates to hole saws and more especially to an apparatus removably fitted to a hole slaw, the apparatus for temporary retention and retrieval of a slug cut by the hole saw.

SUMMARY OF THE INVENTION

The general purpose of the slug retrieval apparatus, described subsequently in greater detail, is to provide a slug retrieval apparatus which has many novel features that result in an improved slug retrieval apparatus which is not anticipated, rendered obvious, suggested, or even implied by prior art, either alone or in combination thereof.

To attain this, the slug retrieval apparatus is provided for use with a hole saw. The hole saw may be driven by any means deemed necessary, such as a drill or bit and brace. The apparatus is used after a pilot hole is drilled, either by a pilot bit within the saw or by another bit. The apparatus is fitted within the chuck mechanism of the hole saw. The hole saw is then used to cut the hole in the workpiece, such as a pipe, plank, or other object. The shaft of the apparatus guides the hole saw cut, as would the shaft of a pilot bit. The springs within the slot of the shaft of the apparatus compress within the slot to allow the shaft to pass through the pilot hole drilled in the workpiece. The springs then expand to capture the shaft within the hole. When the slug is cut from the workpiece by the saw, the springs capture the slug until the user compresses the springs to remove the slug. The springs provide for expansion no matter the speed of the apparatus used to drive the hole saw. The basic design of the apparatus provides for low cost in production and sale. The lack of complexity of the apparatus prevents debris buildup within the apparatus which can serve to inhibit the functions of other devices which might be used in an effort to capture a slug. The apparatus is ideally made of metal, such as stainless steel or other appropriate alloy. The apparatus is offered in more than one size and length.

Thus has been broadly outlined the more important features of the improved slug retrieval apparatus so that the detailed description thereof that follows may be better understood and in order that the present contribution to the art may be better appreciated.

An object of the slug retrieval apparatus is to be basic.

Another object of the slug retrieval apparatus is to temporarily replace the pilot bit of a hole saw.

A further object of the slug retrieval apparatus is to inexpensively produced and sold.

An added object of the slug retrieval apparatus is to operate correctly at any revolutionary speed of the hole saw.

These together with additional objects, features and advantages of the improved slug retrieval apparatus will be readily apparent to those of ordinary skill in the art upon reading the following detailed description of presently preferred, but nonetheless illustrative, embodiments of the improved slug retrieval apparatus when taken in conjunction with the accompanying drawings.

In this respect, before explaining the current embodiments of the improved slug retrieval apparatus in detail, it is to be understood that the slug retrieval apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved slug retrieval apparatus. It is therefore important that the claims be regarded as including such equivalent constructions insofar as they do not depart from the spirit and scope of the slug retrieval apparatus. It is also to be understood that the phraseology and terminology employed herein are for purposes of description and should not be regarded as limiting.

DETAILED DESCRIPTION OF THE DRAWINGS

Figure 1:
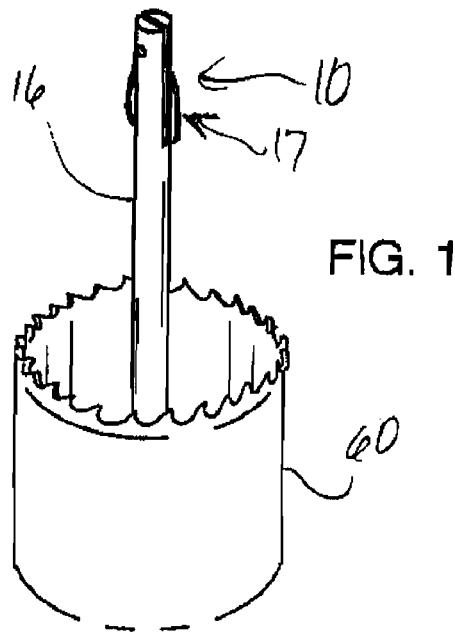
FIG. 1 is a perspective view of the apparatus within a hole saw
Figure 2:
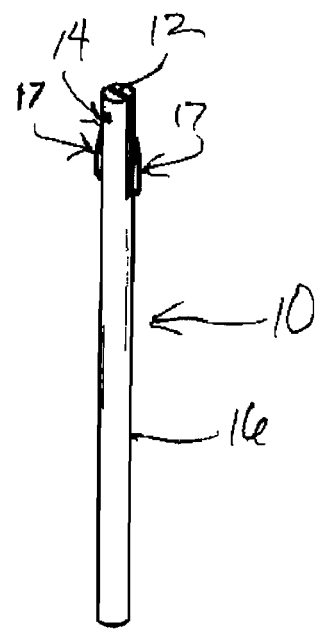
FIG. 2 is a perspective view of the apparatus accompanying an exploded view of a hole saw and chuck mechanism.
Figure 2:
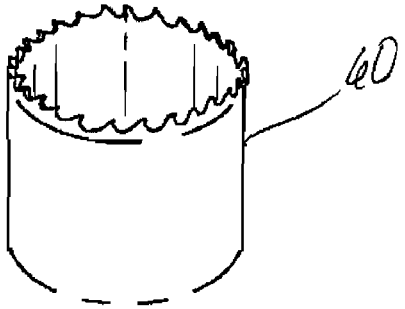
Figure 2:
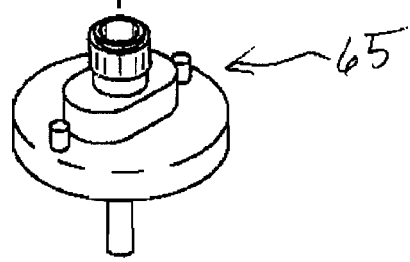
Figure 3:
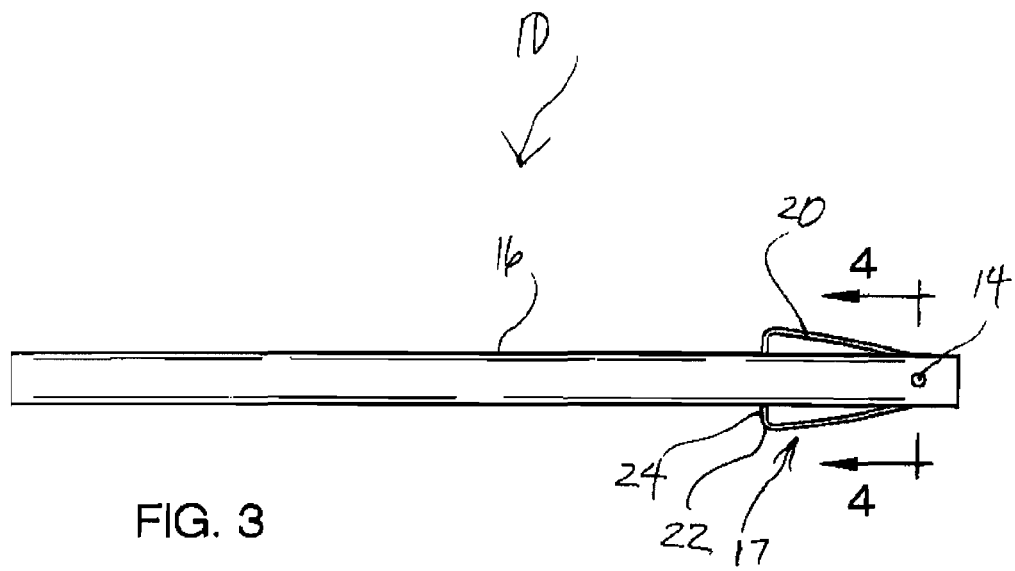
FIG. 3 is a lateral elevation view of the apparatus.
Figure 4:
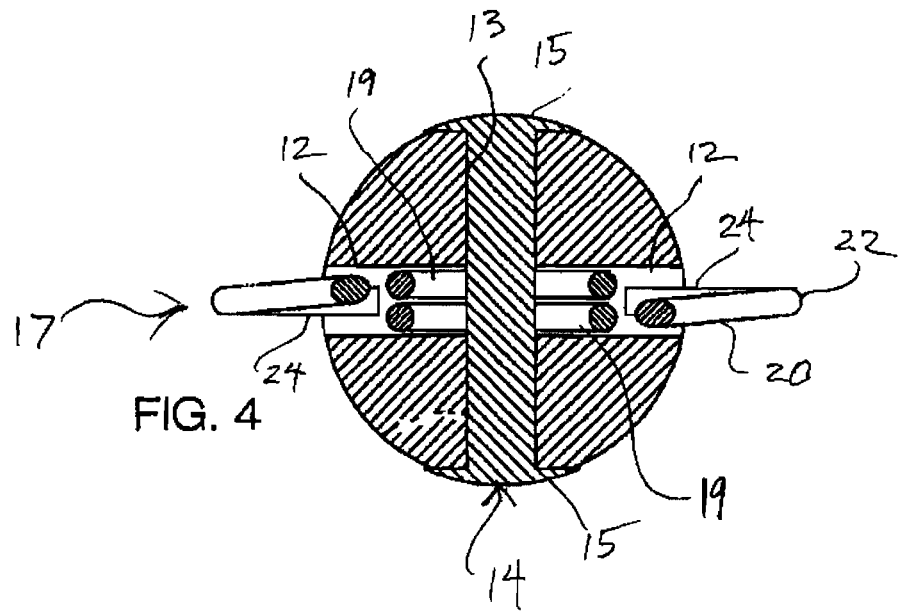
FIG. 4 is a cross sectional view of FIG. 3.
Figure 5:
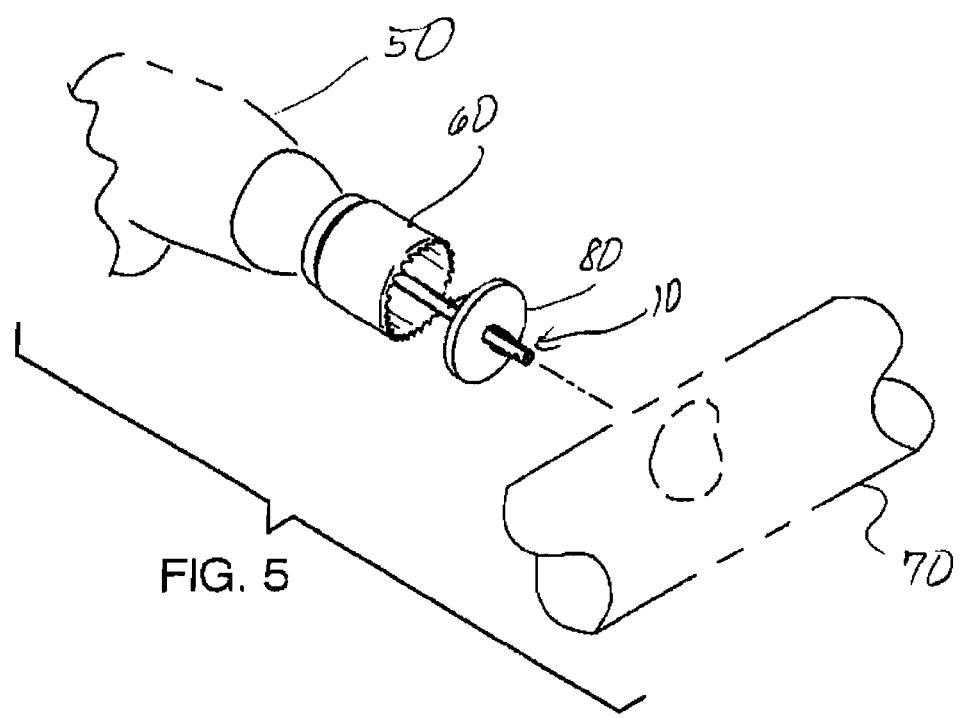
FIG. 5 is a perspective view of the apparatus in use.

With reference now to the drawings, and in particular FIGS. 1 through 5 thereof, the principles and concepts of the slug retrieval apparatus generally designated by the reference number 10 will be described.

Referring to FIGS. 1 through 5, the slug retrieval apparatus 10 is for use with a hole saw 60 with a pilot bit chuck mechanism 65. The apparatus 10 comprises a shaft 16. The shaft 16 has a first end, a second end, and a length therebetween. The second end of the shaft 16 removably fits into the chuck mechanism 65. The slot 12 is disposed within the first end of the shaft 12. The slot 12 has a fore end and an aft end. The pair of opposed springs 17 is disposed within the slot 12 with each spring on an opposite side of the shaft 16. Each spring 17 comprises a coil 19 proximal to the fore end of the slot 12. The coils 19 overlay each other in position within the slot 12. An orifice 13 is disposed proximal to and through the first end of the shaft 16. The orifice 13 is perpendicular to the slot 12. The keeper 14 is disposed within the orifice 13 and passes through the slot 12. The keeper 14 retains the coil 19 of each spring 17 within the slot 12. The means for retaining the keeper 14 within the orifice 13 comprises a flare 15 on each end of the keeper 14.

Each spring 17 is further comprised of a slant 20. Each slant 20 has a first end and a second end. The first end of each slant 20 is extended outwardly from the coil 19 of each spring 17. The slant 20 is capable of movement between a first position and a second position. Each spring 17 is further comprised of a bend 22 at the second end of the slant 20. Each spring 17 bend 22 is disposed proximal to the aft end of the slot 12. The horizontal 24 is extended inwardly from the bend 22 of each spring 17 into the slot 12. The first position of the slant 20 locates a portion of the slant 20, the bend 22, and the horizontal 24 in a position greater than a diameter of the shaft 16. The second position of the slant 20 locates the slant 20, the bend 22, and the horizontal 24 in a position within the slot 12 and less than the diameter of the shaft 16.

In use, a pilot hole is drilled first into the pipe 70 or other workpiece for guiding the hole saw 60. A drill 50 or bit and brace or other type of tool is used to drive the pilot bit and the hole saw 60. The pilot bit is removed and the apparatus 10 is chucked into the chuck mechanism 65 of a hole saw 60. The shaft 16 of the apparatus 10 guides the hole saw 60. The springs 17 slants 20 flex inwardly within the slot 12 so that the springs 17 pass through the pilot hole drilled in the slug 80. The slug 80 is cut out of the pipe 70 by the saw 60. The slug 80 is retained on the shaft 16 of the apparatus 10 until the user depresses the springs 17 to release the slug 80. The slug 80 is thereby prohibited from loss within the pipe 70.

With respect to the above description then, it is to be realized that the optimum dimensional relationships for the parts of the slug retrieval apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the slug retrieval apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the slug retrieval apparatus may be used. Therefore, the foregoing is considered as illustrative only of the principles of the slug retrieval apparatus. Further, since numerous modifications and changes will readily occur to those skilled in the art, it is not desired to limit the slug retrieval apparatus to the exact construction and operation shown and described, and accordingly, all suitable modifications and equivalents may be resorted to, falling within the scope of the slug retrieval apparatus.

What is claimed is:

1. A slug retrieval apparatus for use with a hole saw with a pilot bit chuck mechanism, the apparatus comprising:
    a shaft having a first end, a second end, and a length therebetween, the second end for removable fit into the chuck mechanism;
    a slot disposed within the first end of the of the shaft, the slot having a fore end and an aft end;
    a pair of opposed springs disposed within the slot, each spring comprising:
        a slant having a first end and a second end, the first end of the slant attached within and extended outwardly from the fore end of the slot, the slant capable of movement between a first position and a second position;
        a bend at the second end of the slant, the bend proximal to the aft end of the slot;
        a horizontal extended inwardly from the bend,
        whereby the first position of the slant locates a portion of the slant, the bend, and the horizontal in a position greater than a diameter of the shaft, the second position locates the slant, the bend, and the horizontal in a position within the slot and less than the diameter of the shaft.

2. A slug retrieval apparatus for use with a hole saw with a pilot bit chuck mechanism, the apparatus comprising:
    a shaft having a first end, a second end, and a length therebetween, the second end for removable fit into the chuck mechanism;
    a slot disposed within the first end of the of the shaft, the slot having a fore end and an aft end;
    a pair of opposed springs within the slot, each spring comprising:
        a coil proximal to the fore end of the slot;
        means for retaining the coil of each spring within the slot;
        a slant having a first end and a second end, the first end of the slant extended outwardly from the coil, the slant capable of movement between a first position and a second position;
        a bend at the second end of the slant, the bend proximal to the aft end of the slot;
        a horizontal extended inwardly from the bend into the slot,
    whereby the first position of the slant locates a portion of the slant, the bend, and the horizontal in a position greater than a diameter of the shaft, the second position locates the slant, the bend, and the horizontal in a position within the slot and less than the diameter of the shaft.

3. The apparatus according to claim 2 wherein the means for retaining the coil of each spring within the slot further comprises an orifice disposed proximal to and through the first end of the shaft, the orifice perpendicular to the slot;
    a keeper disposed within the orifice, the keeper retaining the coil of each spring within the slot;
    means for retaining the keeper within the orifice.

4. The apparatus according to claim 3 wherein the means for retaining the keeper within the orifice further comprises a flare on an each end of the keeper.

* * * * *